United States Patent [19]

Higaki

[11] Patent Number: 5,124,754

[45] Date of Patent: Jun. 23, 1992

[54] IMAGE FORMING APPARATUS MANAGED BY USE OF INFORMATION-BEARING MEDIA

[75] Inventor: Masahiro Higaki, Toyokawa, Japan

[73] Assignee: Minolta Camera Kabushiki Kaisha, Osaka, Japan

[21] Appl. No.: 729,210

[22] Filed: Jul. 12, 1991

[30] Foreign Application Priority Data

Jul. 16, 1990 [JP] Japan .................. 2-188720

[51] Int. Cl.⁵ .................. G03G 15/00; G03G 21/00
[52] U.S. Cl. .................. 355/18; 355/201; 355/202; 355/314; 364/406
[58] Field of Search .................. 355/201, 202, 18, 133, 355/314; 364/406, 464.03; 380/23

[56] References Cited

U.S. PATENT DOCUMENTS

| | | | |
|---|---|---|---|
| 4,531,826 | 7/1985 | Stoughton et al. | 355/201 |
| 4,802,218 | 1/1989 | Wright et al. | 380/23 |
| 4,900,904 | 2/1990 | Wright et al. | 364/464.03 X |
| 4,956,666 | 9/1990 | Allen et al. | 355/201 |
| 4,999,672 | 3/1991 | Rice, Jr. et al. | 355/202 |
| 5,016,171 | 5/1991 | Connolly et al. | 364/406 |
| 5,066,977 | 11/1991 | Yoshizuka | 355/201 |

FOREIGN PATENT DOCUMENTS 54-44523 4/1979 Japan .
56-51758 5/1981 Japan .

Primary Examiner—Richard A. Wintercorn
Attorney, Agent, or Firm—Burns, Doane, Swecker & Mathis

[57] ABSTRACT

An image forming apparatus which comprises a reading device for reading first and second information given to the reading device one at a time, a manager for managing the image forming apparatus according to the first information read by the reading device, and a control unit for disabling the manager while enabling an image forming system in the event that the second information is read by the reading device. The first and second information is recorded on user's and servicing cards, respectively, each adapted to be set at the reading device. With the user's card bearing the first information set at the reading device, an internal counter installed in the image forming apparatus can perform its counting operation to count the cumulative number of copies being made. On the other hand, in the event that the servicing card bearing the second information peculiar to a respective servicing specialist is set at the reading device, the internal counter can be disabled while the image forming apparatus is still available for making copies.

6 Claims, 3 Drawing Sheets

IMAGE FORMING APPARATUS MANAGED BY USE OF INFORMATION-BEARING MEDIA

BACKGROUND OF THE INVENTION

1. Field of the Invention

The present invention generally relates to a copying machine and, more particularly, to a machine management system for the copying machine for administrating the machine according to information read from one of a plurality of information-bearing cards.

2. Description of the Prior Art

It is known to provide a copying machine with a machine management system. One type of machine management system hitherto known, herein referred to as a counter-based management system, includes a total counter device capable of providing information associated with both of the number of copies being made and the cumulative monetary amount incurred by any user of the copying machine in making copies with the copying machine.

Another type of machine management system hitherto known, hereinafter referred to as a key-based management system, includes key counters adapted to be distributed to a corresponding number of corporate departments or sections and each for use by one of a number of employees belonging to a particular one of the corporate departments or sections when the copying machine is to be used. Each of the key counters is capable of storing the number of copies made with the copying machine for the particular corporate department or section, and the cumulative monetary amount incurred in making the copies for the particular corporate department or section can be calculated on the basis of the number of the copies stored in the associated key counter.

Where particulars of use of the single copying machine by each of groups of any one of the corporate departments or by each of the individual department employees, such as, for example, the frequency of use thereof and the number of copies made thereby, are desired to be comprehended, any one of the prior art counter-based and key-based management systems is incapable of effectively managing the copying machine because of too much information required to be handled thereby.

In an attempt to substantially eliminate the above discussed problem, a machine management system operable with the use of one of a plurality of information-bearing cards each having a department code or an employee code recorded either magnetically or optically thereon has been suggested in, for example, the Japanese Laid-open Patent Publications No. 54-44523, published Apr. 9, 1979, and No. 56-51758, published May 9, 1981. This machine management system, hereinafter referred to as a card-based management system, comprises a card reader for reading information from one of the information-bearing cards which has been inserted therein, and the information read by the card reader can be stored in a memory device installed in the copying machine for later outputting thereof to an external processor.

While the prior art card-based management system appears to be satisfactory, it has been found having a problem which tends to occur when the copying machine falls into trouble requiring a servicing specialist to handle it. Specifically, immediately after a repair done by a servicing specialist to bring the copying machine into right position, the servicing specialist exercises a routine job of running the repaired copying machine to make test copies necessary for him or her to determine if all is well. However, where the copying machine in question is equipped with the machine management system, for example, the card-based management system, the servicing specialist has to borrow the information-bearing card from one of the corporate departments or one of the employees belonging to one of the corporate departments before the copying machine is operated for testing purpose.

Once the servicing specialist has run the copying machine with the borrowed information-bearing card for testing purpose after the repair, information stored in the information-bearing card is updated beyond the control of and/or against the will of the authentic owner of such information-bearing card. If the billing of the monetary amount incurred in making the copies is to be done on bona fide basis, the billing will be done by subtracting from the total amount the amount which was incurred in making the test copies. This system imposes an extra tiresome and, yet, cumbersome job on a corporate accountant.

It may be a compromise to remove the card-based management system out from the copying machine when the servicing specialist is going to run the copying machine for testing purpose. However, this is complicated and time-consuming.

The foregoing discussion made in connection with the card-based management system can be equally applicable to the key-based management system.

Accordingly, there continues to be a need for an improvement in and of the card-based management system which can be disabled when the servicing specialist operates the copying machine for testing purpose subsequent to the repair.

SUMMARY OF THE INVENTION

Thus, according to one aspect of the present invention, there is provided an image forming apparatus which comprises a reading device for reading first and second information given to the reading device one at a time, a managing means for managing the image forming apparatus according to the first information read by the reading device, and a control means for disabling the managing means while enabling an image forming system in the event that the second information is read by the reading device.

Preferably, the first and second information is recorded on respective cards each adapted to be set at the reading device.

According to another aspect of the present invention, there is provided a method for managing the image forming apparatus which comprises the steps of setting a card having predetermined information recorded thereon, at a reading device, reading the predetermined information on the card by the reading device, managing the image forming apparatus according to the predetermined information read from the card, and disabling a management of the image forming apparatus while enabling the image forming apparatus to continue an image forming process when the card having the predetermined information is set at the reading device.

According to the present invention, the image forming apparatus equipped with the card-based management system is available for making copies only when and so long as any one of user's cards each bearing a department code or an individual employee code thereon is set at the reading device. With any one of the user's cards set at the reading device, an internal counter installed in the image forming apparatus can perform its counting operation to count the cumulative number of copies being made.

On the other hand, in the event that at least one servicing card bearing thereon specific information peculiar to a respective servicing specialist is set at the reading device, the internal counter can be disabled while the image forming apparatus is still available for making copies.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Figure 1:
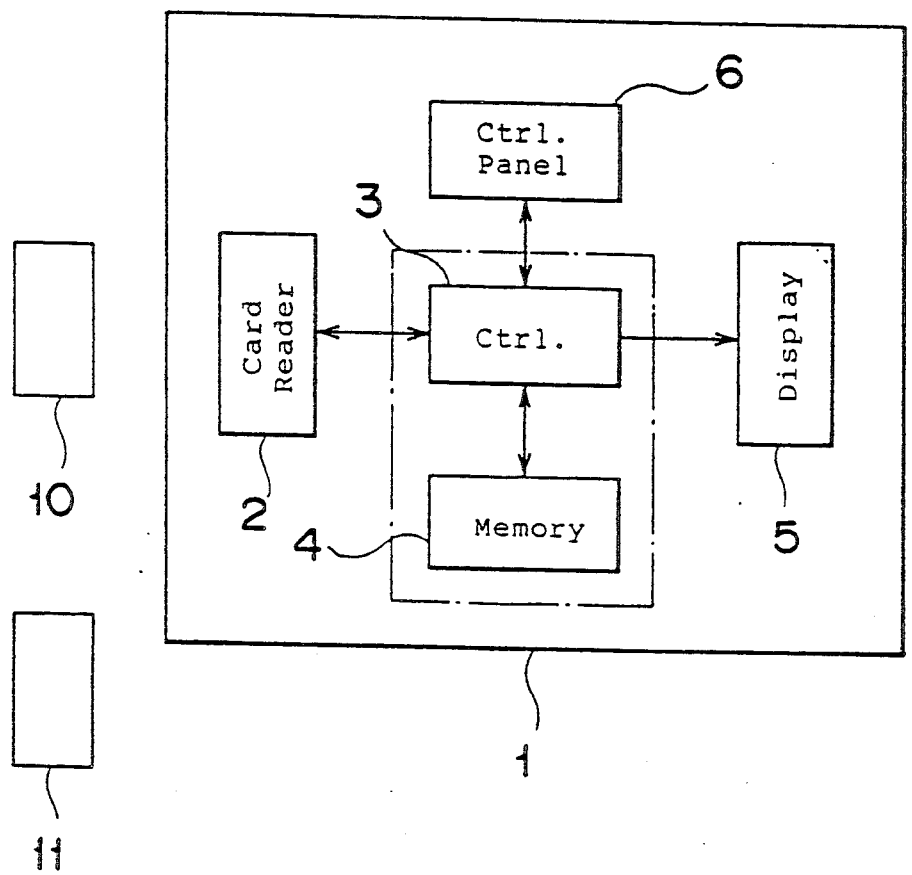
FIG. 1 is a schematic block diagram showing a copying machine embodying the present invention.

Referring first to FIG. 1, a copying machine 1, which may be an electrophotographic copying machine of any know construction, includes a card reader 2, a control unit 3, a memory unit 4, a display unit 5 viewable by any one of users of the copying machine 1 and a control panel 6 accessible to any one of the users. Two types of cards each adapted to be set at the card reader 2 are generally identified by 10 and 11; the card 10 being referred to as a user's card and the card 11 as a servicing card. The user's card 10 is of a type having recorded thereon a data associated with a code allocated to a particular corporate department or section or to an individual department employee. On the other-hand, the servicing card 11 is of a type having recorded thereon a special code data different from any one of the data that can be utilized on the user's cards, and is adapted to be possessed by a servicing specialist which may be an employee of a manufacture of the copying machine.

When any one of the users is desired to use the copying machine 1, he or she has to set the user's card 10 at the card reader 2. The card reader 2 then reads the code data recorded on such user's card 10 and transfer it to the control unit 3 in the copying machine. The control unit 3 receiving the code data transferred from the card reader 2 makes a decision to determine if the code data on the user's card 10 matches with a predetermined code data and sets the copying machine in position available for making copies in the event that the code data on the user's card 10 matches with the predetermined code data. As a copying operation proceeds, the control unit 3 causes the display unit 5 to provide a visual indication of the cumulative number of copies made for the particular corporate department or section associated with the user's card 10 that has been set at the card reader 2, and also causes an internal counter to count the number of copies being then made so that the internal counter can provide a count signal to the memory unit 4 for the storage at one of copy counter areas which is associated with such particular corporate department or section.

On the other hand, in the event that a servicing specialist is going to rectify a trouble occurring in the copying machine 1, the servicing specialist has to set the servicing card 11 at the card reader 2. The special code data read by the card reader 2 from the servicing card 11 is transferred to the control unit 3 which, when it determines that the servicing card 11 actually set at the card reader 2 has the special code data recorded thereon, subsequently controls the copying machine to retain its operative position, but disables the internal counter so that the latter will not perform a counting operation to count the number of copies which would be made when the servicing specialist runs the copying machine for testing purpose. Simultaneously with disabling the internal counter, the control unit 3 causes the display unit 5 to provide an indication of maintenance data stored in the memory unit 4. The maintenance data stored in the memory unit 4 may include the cumulative number of occurrences of paper jamming having previously taken place in the copying machine, the cumulative number of batches of toner having been previously supplied into a developing unit in the copying machine, the cumulative number of use of a document feed mechanism and so on. The servicing specialist may refer to those maintenance data displayed by the display unit 5 during the course of repair of the copying machine.

Figure 2:
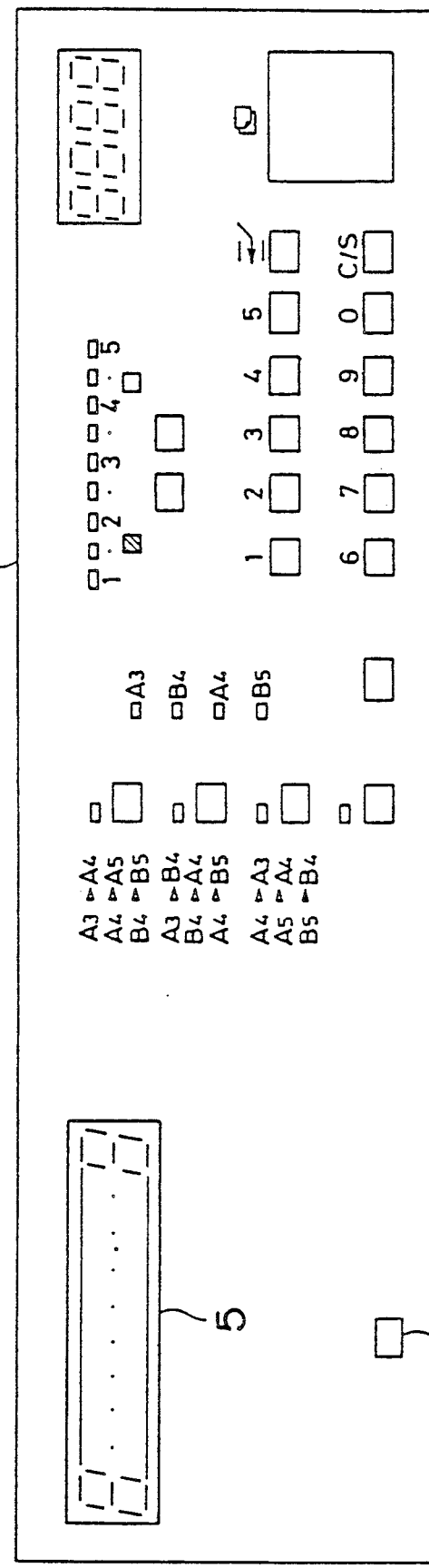
FIG. 2 is a plane view, on an enlarged scale, of an control panel on the copying machine.

Referring now to FIG. 2 showing the control panel 6 in detail in plane view, the control panel 6 mounted, for example, atop the machine casing has disposed thereon a keyboard arrangement including a plurality of paper size selector keys and numeric entry keys, and a display window including paper size indicator lamps (which may comprise light emitting diodes) and copy number display indicators (which may also comprise light emitting diodes). Of them, the display unit 5 is used for the display of the data stored in the memory unit 4 and comprises a row of seven-segment display elements operatively coordinated with each other to provide any one of a plurality of visual indications of alphanumeric information.

Shown as positioned on the control panel 6 at a location below the display unit 5 as viewed in FIG. 2 is a changeover key for switching from one visual indication being displayed at the display unit 5 to another each time the changeover key 50 is depressed. The changeover key 50 may be available in one of the two modes associated respectively with the use of the user's card 10 and the servicing card 11. Specifically, each time the changeover key 50 is depressed while in one of the modes associated with the use of the user's card 10, the cumulative number of copies of all paper size and the cumulative number of copies for each paper size can be sequentially displayed at the display unit 5 while, each time the changeover key 50 is depressed while in the other of the modes associated with the use of the servicing card 11, the cumulative number of occurences of paper jamming and the cumulative number of batches of toner supplied can be sequentially displayed at the display unit 5.

Figure 3:
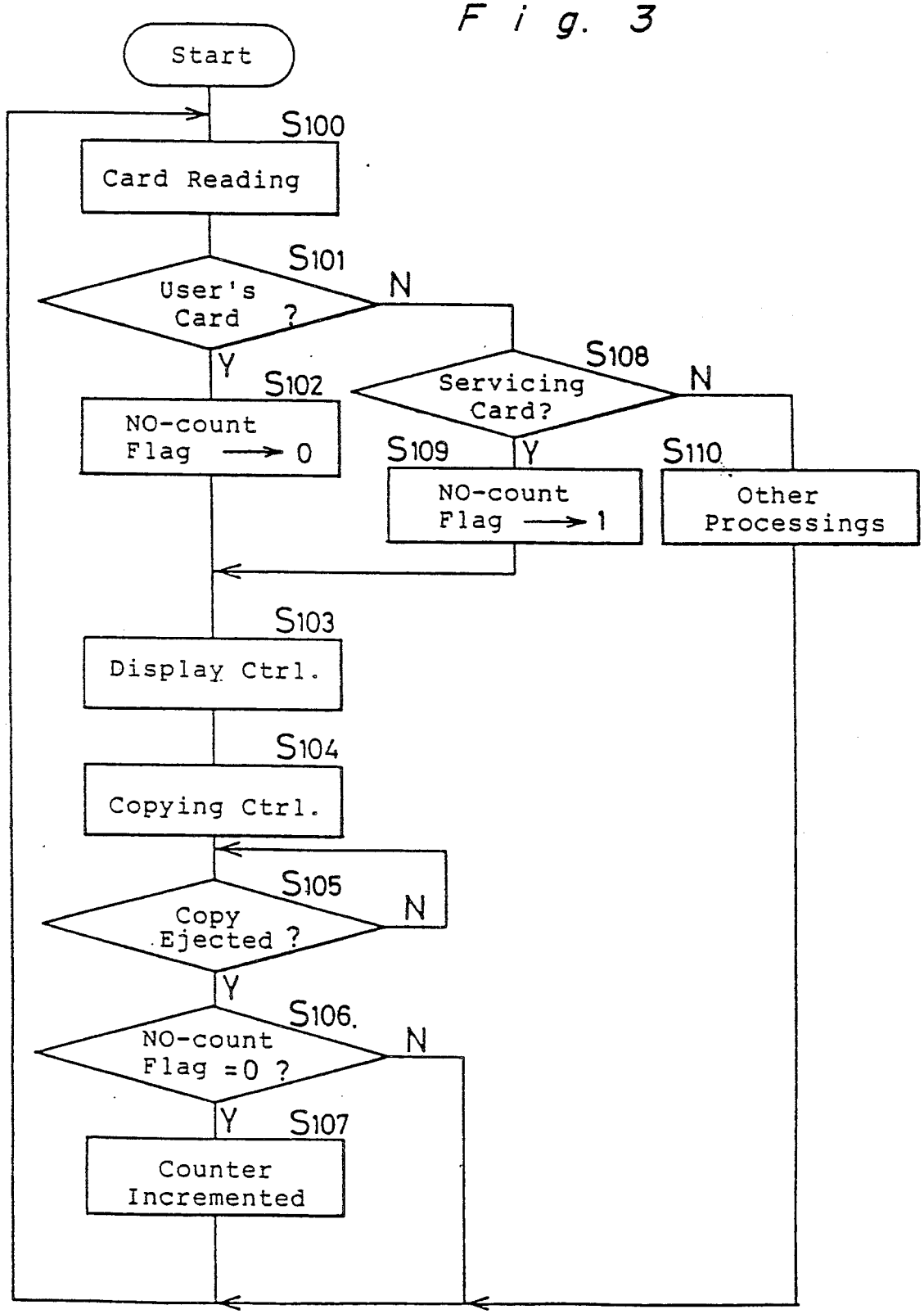
FIG. 3 is a flowchart showing the sequence of operation of the copying machine when an information-bearing card is set at a card reader.

The sequence of control performed when either the user's card 10 or the servicing card 11 is set at the card reader 2 is shown in FIG. 3, reference to which will now be made.

Referring to FIG. 3, and subsequent to the start of the control flow, card data on one of the cards 10 and 11 which is then set at the card reader 2 is read by the card reader 2 at step S100, followed by a decision at step S101 to determine if the card actually set at the card reader 2 is the user's card 10. Should it be determined that the user's card 10 has been set at the card reader 2, a NO-count flag is set to "0" at step 102, setting a counter in position ready to be usually incremented. On the other hand, should it be determined at step S101 that the user's card 10 has not been set at the card reader 2, another decision is made at step S108 to determine if the card actually set at the card reader 2 is the servicing card 11.

In the event that the decision at step S108 indicates that the servicing card 11 has been set at the card reader 2, a NO-count flag is set to "1" at step S109, setting the counter in position not to be incremented. On the other hand, in the event that the decision at step S108 indicates that the servicing card 11 is not set at the card reader 2, a further decision is made at step S110 to determine if the card actually set at the card reader 2 is one of other cards.

Subsequent to any one of steps S102 and S109, the control flow goes to step S103 at which a display control is performed to control the display unit 5 to provide visual indication of one of the data in the memory unit 5 according to and associated with one of the cards 10 and 11 actually set at the card reader 2. Thereafter, and at step S104, any known copying operation is performed to provide a copy of an original documents. A decision is then made at step S105 to determine if the copy has been ejected and, in the event that it has been ejected, a next subsequent decision is made at step S106 to determine if the NO-count flag is set to "0". If the decision at step S106 indicates that the NO-count flag has been set to "0", the counter is incremented at step S107, followed by a return of the control flow, thereby completing one cycle of control.

Thus, according to the present invention, when the servicing card possessed by a servicing specialist is set at the card reader in the machine management system for the copying machine equipped with the card reader, the counter can be controlled so as not to be incremented while copying mechanisms of the copying machines are permitted to operate. Accordingly, test copies made by the servicing specialist subsequent to the repair or any other servicing of the copying machine will not be counted by the counter and, therefore, the problem associated with the cumbersome billing which would occur when the servicing specialist runs the copying machine for testing purpose using the user's card can be advantageously eliminated. The removal of the machine management system hitherto suggested need be performed.

Although the present invention has been fully described in connection with the preferred embodiment thereof with reference to the accompanying drawings, it is to be noted that various changes and modifications are apparent to those skilled in the art. By way of example, the present invention may not be always limited to the illustrated embodiment, but can work satisfactorily with the card reader of a type having a data writing capability by which data stored in the memory unit can be written on at least one or both of the user's and servicing card.

Also, arrangement may be made so that the data stored in the memory unit can be transferred to an external printer and, for this purpose, the control panel may have an operating key associated with an interface to the external printer.

Accordingly, such changes and modifications are to be understood as included within the scope of the present invention as defined by the appended claims, unless they depart therefrom.

What is claimed is:

1. An image forming apparatus comprising:
    a reading device for reading an information recorded in a card set thereat;
    managing means for managing the image forming apparatus according to the information read by said reading device; and
    control means for controlling said managing means to be out of operation while controlling an image forming system to be in operation when the card having a predetermined information is set at the reading device.

2. An image forming apparatus as claimed in claim 1, wherein said managing means includes a counter for counting the number of copied sheets.

3. An image forming apparatus as claimed in claim 2, further comprising:
    storing portion for storing data of the number of the copied sheets counted by said counter; and
    display portion for displaying the data stored in said storing portion.

4. An image forming apparatus comprising:
    reading means for reading first and second information given to the reading means;
    managing means for managing the image forming apparatus in response to said first information read by said reading means; and
    control means for controlling said managing means to be out of operation while controlling an image forming system to be in operation in response to the reading of said second information.

5. A method in an image forming apparatus having a reading device for reading an information recorded in a card, said method comprising the steps of:
    setting the card at the reading device;
    reading the information of the card by the reading device;
    managing the image forming apparatus according to the read card information; and
    stopping the management of the image forming apparatus while performing the image information when the card having a predetermined information is set at the reading device to be read.

6. A method as claimed in claim 5, further comprising the steps of:
    storing the data of the management of the image forming apparatus in a storing portion; and
    displaying at a display portion the data stored in the storing portion.

* * * * *